Feb. 13, 1934.  N. A. NICHOLSON  1,946,984
AUTOMOBILE JACK
Filed Oct. 25, 1932   2 Sheets-Sheet 2
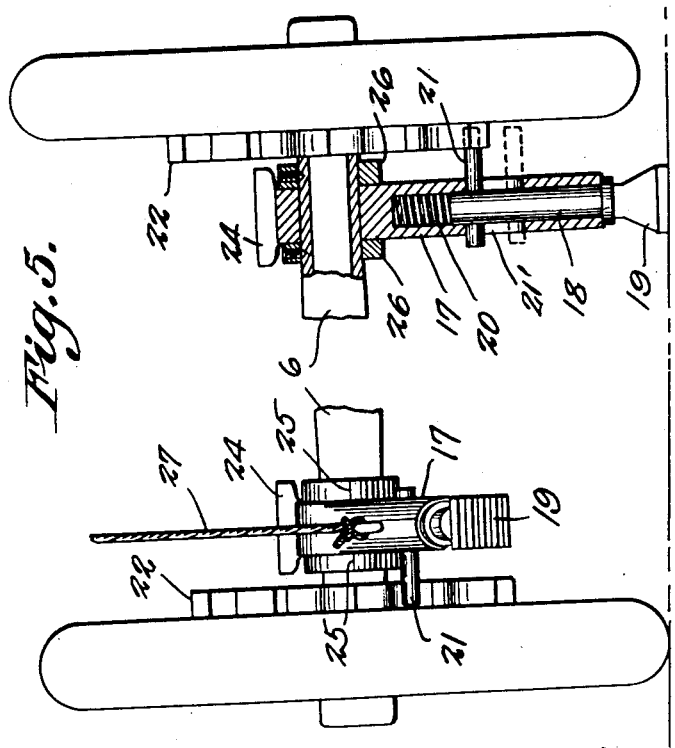
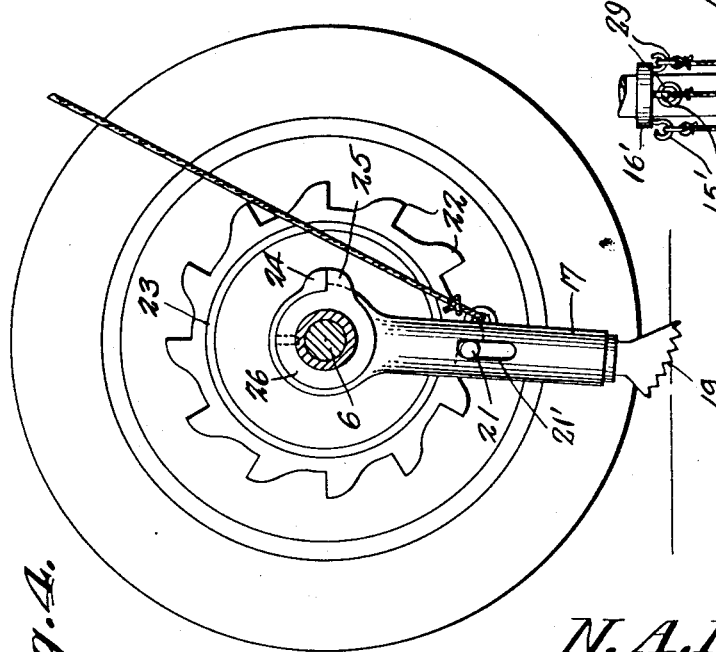
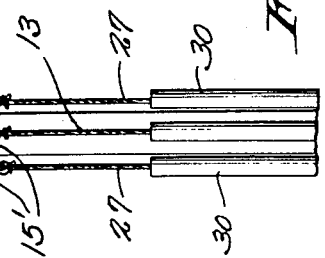
N. A. Nicholson
Inventor
By C. A. Snow & Co.
Attorneys.

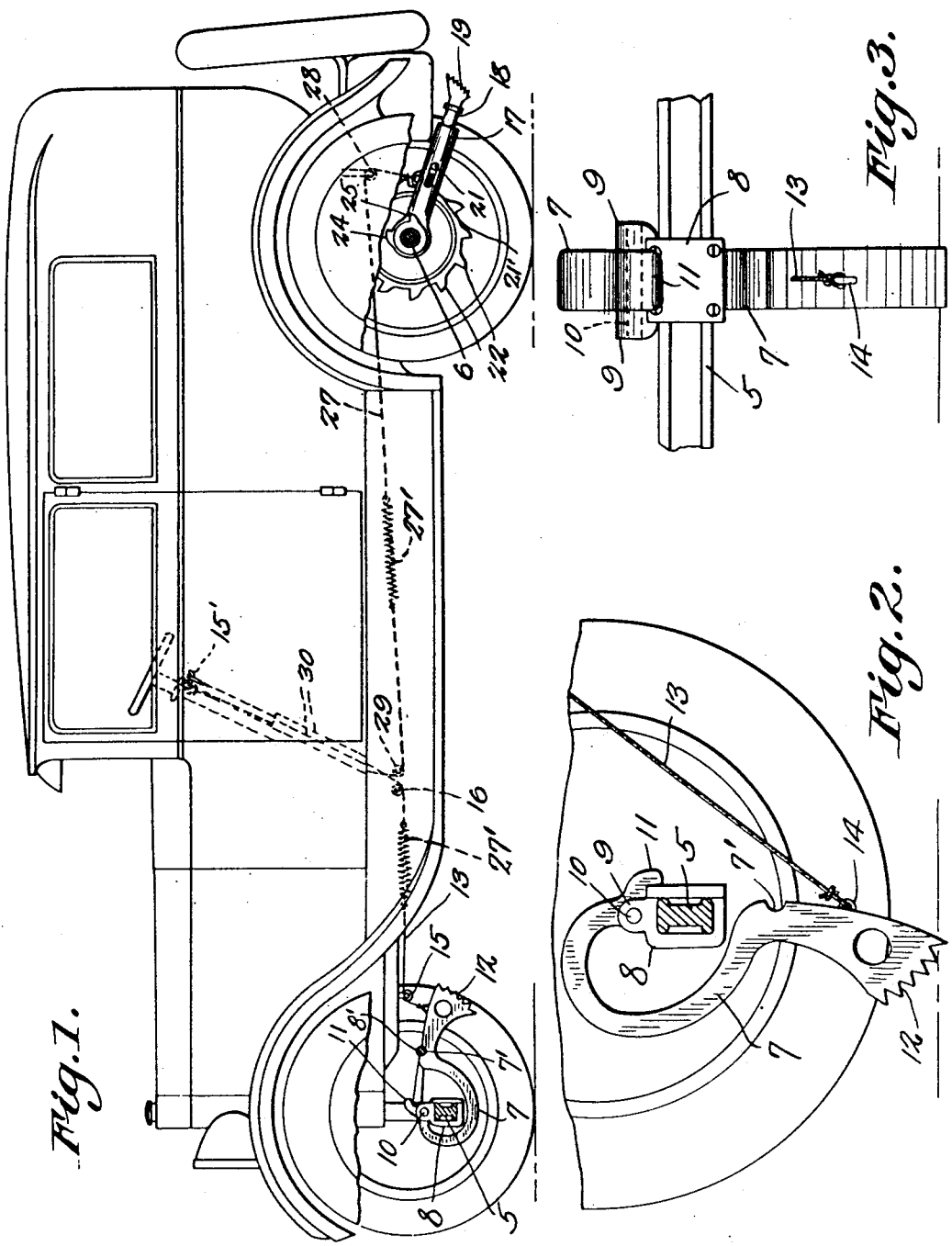

Patented Feb. 13, 1934

1,946,984

UNITED STATES PATENT OFFICE 1,946,984

AUTOMOBILE JACK

Nicholas A. Nicholson, Johnstown, Pa.

Application October 25, 1932. Serial No. 639,523

6 Claims. (Cl. 254—94)

This invention relates to jacks, designed for use in connection with motor vehicles, the primary object of the invention being to provide a jack of a construction to be carried on the axle of a vehicle, and adapted to operate under the momentum of the vehicle, when the jack has been lowered to contact with the ground surface.

An important object of the invention is the provision of a device of this character including a body portion carried on the rear axle of the vehicle and cooperating with lugs secured to the brake drums of the vehicle, elevating the vehicle, as the vehicle moves thereover.

A further object of the invention is to provide operating means for the jack, which may be conveniently operated from a point adjacent to the driver's seat, to the end that the operator may have complete control over the levers and control means of the jack.

A still further object of the invention is to provide a jack of this character, which may be readily and easily mounted on the usual motor vehicle structure, without the necessity of making extensive alterations in the construction of the vehicle, to mount the jack.

With the foregoing and other objects in view, which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Figure 1 is a side elevational view of a motor vehicle equipped with jacks constructed in accordance with the invention.

Figure 2 is a fragmental sectional view through a front axle and illustrating the type of jack used with the front axle.

Figure 3 is a rear elevational view thereof.

Figure 4 is a sectional view through a rear axle and its housing equipped with a rear axle jack.

Figure 5 is a rear elevational view illustrating the jack near one end of the rear axle, as in its inactive position, while the jack at the opposite end of the axle is in its active position and shown in section.

Figure 6 is a view illustrating the manner of securing the operating cables to the steering post.

Referring to the drawings in detail, the front axle of a vehicle is indicated by the reference character 5, while the rear axle thereof is indicated by the reference character 6.

The jack that is used for elevating the front end of a motor vehicle, is arranged near the center of the axle 5.

As shown, the front jack embodies an arm 7 which is curved, as clearly shown by Figure 2 of the drawings, so that it may swing under the axle 5, from a position as shown by Figure 1 of the drawings to a position as shown by Figure 2 of the drawings.

The arm 7 is secured to the front axle, by means of a separable clamp 8, which is formed with spaced ears 9 apertured to receive the pin 10 that also passes through the arm 7, at a point near the upper end of the arm. The arms 7, are provided with notches 7', designed to engage the stop rod 8', at the front of the machine as clearly shown by Figure 1 of the drawings.

Thus it will be seen that due to this construction, the arm which is pivotally mounted on the front axle, is of a length to elevate the front axle, when the vehicle moves rearwardly, after the arm has been dropped to engage the surface on which the vehicle is resting.

It will further be seen that due to the length of the arm 7, the axle will be elevated when the arm 7 moves to its vertical or active position. In order to limit the movement of the vehicle with respect to the arm, a lug 11 is provided at the upper extremity of the arm, which lug is shaped to fit over the clamp 8.

As clearly shown by Figure 2 of the drawings, the free end of the arm 7 is substantially wide and inclined, the rear edge of the free end being a greater distance from the pivot pin 10 than the forward edge of the free end, with the result that as the free end of the arm contacts with the ground surface, the vehicle will be raised gradually.

Teeth 12 are formed on the free edge of the arm 7, and bite into the ground surface to prevent slipping of the jack under rearward movement of the vehicle being lifted.

The operating cable, by means of which the jack is elevated or lowered, is indicated by the reference character 13, and has connection with the jack arm 7, at 14, the cable passing over pulleys 15 and 16 arranged under the vehicle, from where the cable passes upwardly and is positioned over the hook 15', provided for the cable, and arranged on the steering column of the vehicle.

Thus it will be seen that due to this construction, the operator may, should it be desired to elevate the front end of the vehicle, drop the jack arm. As power is applied to the drive wheels of the vehicle to move the vehicle rearwardly, the the teeth 12 will bite into the surface on which the vehicle rests, and the vehicle will swing upwardly thereover, until the stop lug contacts with the clamp, preventing further rearward movement of the vehicle and causing the vehicle to remain in a elevated position.

The jacks, which are mounted near the wheels, of the rear axle of the vehicle, include tubular body portions 17 which are mounted for swinging movement with respect to the rear axle or axle housing.

Operating in each tubular body portion 17, is a jack post 18, which is formed with a head 19 at its outer or free end, the head having its outer edge inclined and formed with teeth, to cause the jack to gradually raise the vehicle.

A coiled spring 20 is held between the inner end of each jack post and the tubular body portion in which it is mounted, so that the normal tendency will be to extend the jack post, for purposes to be hereinafter more fully described.

The reference character 21 designates an arm that extends transversely through the jack post and operates in slots 21' formed in the sides of the tubular body portion 17, the arm cooperating with teeth 22 that are carried on bands 22', that in turn are secured to the brake drums 23 of the vehicle.

It will be seen that when the jacks are dropped into engagement with the ground surface and power is applied to the rear wheels, the teeth 22 will engage the arms 21, directing a pressure against the arms, and causing the vehicle to move rearwardly, under the momentum of the vehicle, the vehicle will swing upwardly, as the jacks move to their vertical positions.

Lugs indicated by the reference character 24 extend laterally from the body portion of each jack, and contact with stops 25, extending from the collars 26, that are mounted on the rear axle housing, and which hold the jacks against movement longitudinally of the axle housing.

The cables for operating the rear jacks are indicated by the reference character 27, and pass over pulleys 28 and 29, from where they pass upwardly through the tubes 30, and are supplied with rings 29' that are hooked onto the proper hooks 15 of the steering post, which are carried by the ring 16'. Springs 27' are connected in the cables, and act to tension the cables at all times.

It might be further stated that because of the springs 20, the jack posts 18 are moved to positions so that the arms 21 cannot contact with the lugs 22 of the brake drums, when the jacks are in their inactive positions.

To lower the vehicle elevated by the jack, it is only necessary to start the motor of the vehicle and cause the vehicle to move forwardly and place the ends of the cables in their normally supported positions about the steering post, whereupon the jack arms will swing under the vehicle, to their normal positions.

Having thus described the invention what is claimed is:

1. The combination with the drive wheels and axle of a motor vehicle, of a motor vehicle jack, including bands having teeth, secured to the brake drums of the wheels, tubular members pivotally mounted on the axle, jack posts slidably mounted within the tubular members, means for normally urging the jack posts to their extended positions, arms connected to the jack posts and extending transversely through the tubular members, said arms adapted to engage the teeth of the bands, and thereby connect the jacks to the wheels, and means for restricting movement of the motor vehicle with respect to the jacks.

2. The combination with the drive wheels and axle of a motor vehicle of a motor vehicle jack including bands having teeth, secured to the brake drums of the wheels, tubular members pivotally mounted on the axle, jack posts slidably mounted within the tubular members, coiled springs within the tubular members and engaging the jack posts for normally urging the jack posts outwardly, means carried by the jack posts and engaging the teeth of the bands, and thereby connect the jacks to the wheels, said jacks being of lengths to elevate the wheels when the jacks move into engagement with the ground surface, and means for moving the jacks to their active positions.

3. The combination with the axle housing and the drive wheels of a motor vehicle, of a jack for each wheel, comprising a body portion including outer and inner telescoping sections, mounted on the axle housing and adapted to swing downwardly into engagement with the ground surface, a spring for normally urging the inner section of the body portion to the limit of its outward movement, means for moving the jack into engagement with the ground surface, and engaging means adapted to connect the wheels and body portion when pressure is applied against the body portion by the rearward movement of the wheels, and said body portion adapted to elevate the vehicle, when the vehicle moves thereover.

4. The combination with the axle housing and drive wheels of a motor vehicle, of a jack for each wheel, each jack comprising telescoping sections, means for normally holding the telescoping sections in their extended positions, cooperating means on the jacks and wheels connecting the jacks and wheels when the telescoping sections are in their retracted positions, and means for restricting movement of the motor vehicle with respect to the jacks.

5. The combination with the axle housing and drive wheels of a motor vehicle, of a jack for each wheel, each jack comprising a section pivotally mounted on the axle, a jack section mounted on each pivoted section and slidable longitudinally thereover, means for connecting the jacks and wheels when the slidable jack sections are in their retracted positions, elevating the vehicle when the vehicle moves over the jacks, and means for restricting movement of the jacks with respect to the wheels.

6. The combination with the axle housing and drive wheels of a motor vehicle, of a jack for each wheel, each jack comprising a body portion pivotally mounted on the axle housing adjacent to a wheel, a normally extended movable jack section forming a part of each jack and adapted to engage the ground surface to elevate the vehicle, and cooperating means on the jacks and wheels causing the vehicle to be elevated, when the vehicle moves over the jacks.

NICHOLAS A. NICHOLSON.